(12) United States Patent
Staab et al.

(10) Patent No.: US 9,950,873 B2
(45) Date of Patent: Apr. 24, 2018

(54) CONVEYOR INSPECTION WITH UNMANNED VEHICLE CARYING SENSOR STRUCTURE

(71) Applicants: ABB TECHNOLOGY AG, Zurich (CH); Thomas Fuhlbridge, Ellington, CT (US)

(72) Inventors: Harald Josef Staab, Manchester, CT (US); Gregory Rossano, Enfield, CT (US); Eduardo Botelho, Osasco (BR); Thomas Fuhlbrigge, Ellington, CT (US); George Zhang, Windsor, CT (US); Sang Choi, Simsbury, CT (US); Carlos Martinez, New Britain, CT (US)

(73) Assignee: ABB Schweiz AG, Baden (CH)

( * ) Notice: Subject to any disclaimer, the term of this patent is extended or adjusted under 35 U.S.C. 154(b) by 143 days.

(21) Appl. No.: 14/902,970

(22) PCT Filed: Jul. 7, 2014

(86) PCT No.: PCT/US2014/045513
§ 371 (c)(1),
(2) Date: Jan. 5, 2016

(87) PCT Pub. No.: WO2015/009467
PCT Pub. Date: Jan. 22, 2015

(65) Prior Publication Data
US 2016/0152416 A1 Jun. 2, 2016

Related U.S. Application Data

(60) Provisional application No. 61/846,190, filed on Jul. 15, 2013, provisional application No. 61/846,219, filed on Jul. 15, 2013.

(51) Int. Cl.
*G01N 19/00* (2006.01)
*B65G 43/02* (2006.01)
*B65G 23/00* (2006.01)

(52) U.S. Cl.
CPC ............ *B65G 43/02* (2013.01); *B65G 23/00* (2013.01)

(58) Field of Classification Search
CPC ..................................................... B65G 43/02
(Continued)

(56) References Cited

U.S. PATENT DOCUMENTS 2,688,394 A * 9/1954 Hurd ...................... B65G 21/00
198/631.1
3,880,275 A * 4/1975 Fischer .................. B65G 23/22
198/825

(Continued)

FOREIGN PATENT DOCUMENTS

DE 1246535 B 8/1967
DE 3611125 A1 10/1987
(Continued)

OTHER PUBLICATIONS

"MARbot Robtic Idler Predict" brochure accessed at http://www.machineryautomation.com.au/mining-2/materials-handling-mining/robotic-roller-idler-inspection-and-debris-removal/ on Oct. 15, 2013.

(Continued)

*Primary Examiner* — Clayton E Laballe
*Assistant Examiner* — Warren K Fenwick
(74) *Attorney, Agent, or Firm* — Manelli Selter PLLC; Edward J. Stemberger

(57) ABSTRACT

A method inspects a conveyor (10) having opposing sides (34, 35) and a length. The conveyor includes an endless belt (16) and a plurality of roller structures (24) disposed in (Continued)

spaced relation along at least a portion of the length of the conveyor and under a top flight (17) of the belt for supporting the belt while material is being conveyed on the belt. Each roller structure includes at least one roller (12, 12') constructed and arranged to rotate about an axis as the belt is conveyed with the material. The method orients an unmanned vehicle (22), having sensor structure (28) thereon, at one side of the conveyor, and causes the vehicle to travel along the portion of the length of the conveyor while the sensor structure obtains data regarding a state of at least a portion of the belt and of rollers of the plurality of roller structures while the conveyor is operating.

12 Claims, 5 Drawing Sheets

(58) Field of Classification Search
USPC .................. 73/865.8; 348/117, 145, 144
See application file for complete search history.

(56) References Cited

U.S. PATENT DOCUMENTS

| | | | | |
|---|---|---|---|---|
| 4,718,349 A * | 1/1988 | Wahren | ............... | B65G 19/02 104/165 |
| 5,133,448 A * | 7/1992 | Van Niekerk | ............... | B65G 43/02 198/502.1 |
| 5,351,621 A * | 10/1994 | Tanaka | ............... | H04N 7/185 104/94 |
| 6,047,814 A * | 4/2000 | Alles | ............... | B65G 43/02 198/502.1 |
| 6,264,022 B1 * | 7/2001 | Petack | ............... | B65G 15/16 198/626.4 |
| 6,349,819 B1 * | 2/2002 | Nohl | ............... | B65G 39/12 198/830 |
| 6,698,584 B1 * | 3/2004 | Ray | ............... | B65G 21/06 198/860.2 |
| 6,715,602 B1 | 4/2004 | Gartland | | |
| 6,988,610 B2 * | 1/2006 | Fromme | ............... | B65G 43/02 198/502.1 |
| 7,499,776 B2 | 3/2009 | Allard et al. | | |
| 7,784,570 B2 * | 8/2010 | Couture | ............... | B25J 5/005 180/65.8 |
| 7,926,598 B2 * | 4/2011 | Rudakevych | ............... | B62D 55/06 180/8.1 |
| 8,618,929 B2 * | 12/2013 | Ganapathy | ............... | B65G 43/02 340/539.1 |
| 2007/0182953 A1 * | 8/2007 | Tassic | ............... | B65G 17/20 356/237.1 |
| 2008/0223630 A1 | 9/2008 | Couture | | |
| 2009/0147914 A1 | 1/2009 | Schenell | | |
| 2009/0101482 A1 * | 4/2009 | Kusel | ............... | B65G 43/02 198/810.01 |
| 2010/0103260 A1 * | 4/2010 | Williams | ............... | H04N 7/185 348/144 |

FOREIGN PATENT DOCUMENTS

| | | |
|---|---|---|
| JP | 61253406 A | 11/1986 |
| JP | 2005067847 A | 3/2005 |
| JP | 2005330023 A | 12/2005 |
| JP | 2007137595 A | 6/2007 |

OTHER PUBLICATIONS

Lodewijks, "Strategies for Automated Maintenacne of Belt Conveyor Systems", accessed at http://www.saimh.co.za/beltcon/beltcon12/paper1211.htm on Oct. 15, 2013.

Auto Test Products, AUTOSTOP BAMbino, Bearing Acoustic Monitor, http://www.autotest.net.au/prod_bam.asp, dated 2008.

PCT International Search Report & Written Opinion in PCT/US2014/045513 dated Nov. 17, 2014.

* cited by examiner

CONVEYOR INSPECTION WITH UNMANNED VEHICLE CARYING SENSOR STRUCTURE

FIELD

The invention relates to conveyor inspection and, more particularly, to an unmanned vehicle carrying sensor structure that travels alongside the moving conveyor to inspect the conveyor belt and rollers.

BACKGROUND

FIG. 1 shows a sectional view of a portion of a conventional large conveyor, generally indicated 10, which is typically used in mining operations. A set of idlers or upper rollers is carried by a frame 14 and include outer rollers 12 and a central roller 12'. The rollers 12, 12' rotate with respect to the moving, endless belt 16 that carries the material 18. The rollers 12, 12' are provided to ensure that the belt 16 defines a trough for the material 18. A plurality of sets of the rollers is spaced to support the belt 16 along the length of the conveyor 10. Lower rollers 20 support the returning portion of the belt 16'.

There is wear and abrasion on the belt 16 caused by slip, friction, material movement, static and dynamic pulling forces, and environmental conditions. Additionally, the belt 16 may be damaged by misalignment, and by foreign material. A downtime due to belt failure may cause significant production losses. Therefore it is important to detect problems before they cause larger belt damage. Typical indications of upcoming belt failures are small cracks at the edges and at the underside where it bends to trough shape.

Furthermore, failure of the idlers or rollers 12, 12' and their roller bearings causes friction and abrasion. The bearings fail with increasing temperature. A typical lifetime specification of a bearing at 70° C. is 22600 h, but this drops dramatically at higher temperatures (5600 h at 100° C., 2200 h at 120° C.). Factors that cause temperature increase are e.g., quality of manufacturing and assembly, rotation speed, radial load from belt, distance between idlers, grease viscosity, seal, handling and storage of idlers. Typical criteria for replacing idlers are: take note at 70° C., plan replacement at 80° C., and replace above 90° C.

Currently, conveyors are inspected periodically by personnel walking or driving along the length of the conveyor and visually checking for problems. Some inspection crews use thermal cameras to detect the hot spots of failing rollers and roller bearings. Alternatively, conventional automatic inspection systems are usually fixed installations above the belt that measure belt thickness, misalignment or rips at the belt edges. These systems cannot inspect the rollers since the required sensors would be too expensive in that it would not be cost-effective to fix many sensors along the length of the conveyor. Still further, maintenance trolley systems are used that hang from the conveyor. However, since these systems are connected to the conveyor, they are not readily adaptable for use on different conveyors.

Thus, there is a need to provide an unmanned vehicle that is travels adjacent to the operating conveyor to inspect the conveyor. There is also a need to provide a sensor structure that travels adjacent to the operating conveyor in a guided manner to inspect the conveyor.

SUMMARY

An object of the invention is to fulfill the needs referred to above. In accordance with the principles of the present invention, this objective is obtained by a method of inspecting a conveyor having opposing sides and a length. The conveyor includes an endless belt and a plurality of roller structures disposed in spaced relation along at least a portion of the length of the conveyor and under a top flight of the belt for supporting the belt while material is being conveyed on the belt. Each roller structure includes at least one roller constructed and arranged to rotate about an axis as the belt is conveyed along with the material. The method orients an unmanned vehicle, having sensor structure thereon, at one side of the conveyor, and causes the vehicle to travel along the portion of the length of the conveyor while the sensor structure obtains data regarding a state of at least a portion of the belt and of rollers of the plurality of roller structures while the conveyor is operating. While the vehicle is traveling, the sensor structure obtains the data only while being adjacent to the one side of the conveyer, without moving under the top flight of the belt.

In accordance with another aspect of the disclosed embodiment, the objective is obtained by a method of inspecting a conveyor having opposing sides and a length. The conveyor includes an endless belt and a plurality of roller structures disposed in spaced relation along at least a portion of the length of the conveyor and under a top flight of the belt for supporting the belt while material is being conveyed on the belt. Each roller structure includes at least one roller constructed and arranged to rotate about an axis as the belt is conveyed with the material. The method provides guide structure along the length of the conveyor disposed adjacent to at least one of the sides of the conveyor. Sensor structure is carried by the guide structure. The sensor structure is caused to move in manner guided by the guide structure along the length of conveyor with the sensor structure obtaining data regarding a state of at least a portion of the belt and of rollers of the plurality of roller structures while the conveyor is operating.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
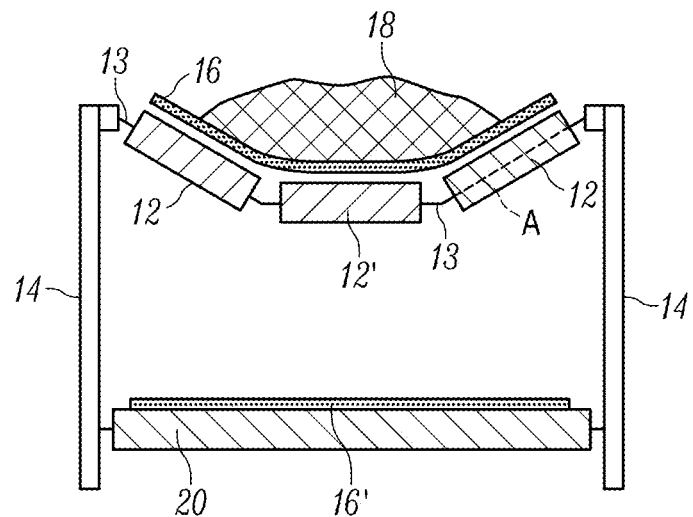
FIG. 1 is a sectional view of a portion of a conventional conveyor showing the belt and upper and lower rollers thereof.
Figure 2:
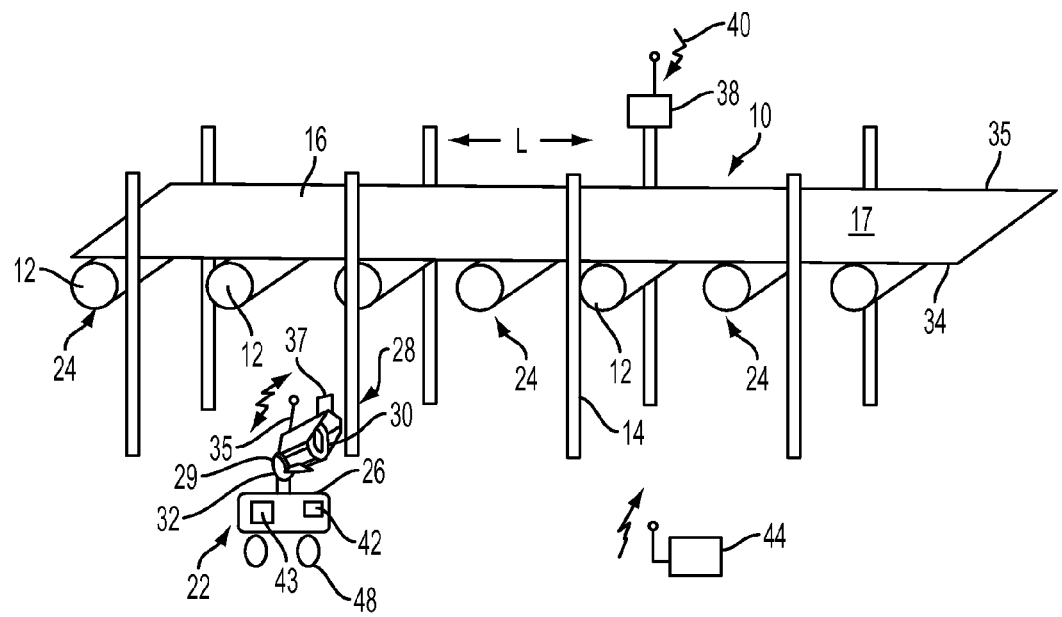
FIG. 2 is a schematic view of a portion of a forward flight of a conveyor with an unmanned vehicle, carrying sensor structure in a pan and tilt arrangement, to inspect rollers at a side of the conveyor in accordance with an embodiment.

With reference to FIG. 2, a schematic view of a portion of a forward flight of a conveyor is shown, generally indicated at 10, being inspected by an unmanned vehicle, generally indicated at 22. The conveyor 10 is conventional and is preferably of the type shown in FIG. 1, having a plurality of roller sets or roller structures 24 carried by the frame 14 under a top flight 17 of the belt 16. Each roller structure 24 preferably includes the two outer rollers 12 and the central roller 12' of FIG. 1. Each roller 12, 12' rotates about an axis A via bearings 13 as the endless belt 16 is conveyed along with material 18. The return flight of the belt 16, the lower rollers 20, and the material 18 being conveyed are not shown in FIGS. 2 and 4. Alternatively, the roller structure can comprise two or four rollers.

As noted above, wear and abrasion of the belt 16 is caused by slip, friction, material movement, belt deformation, static and dynamic stretching forces, and environmental conditions. Additionally, the belt 16 may be damaged by misalignment and foreign material. Furthermore, failure of the idlers or rollers 12, 12' and roller bearings causes friction and abrasion. The bearings fail with increasing temperature. Therefore, a conveyor 10 is inspected regularly to detect problems before they result in downtime and larger damage. In accordance with an embodiment and as shown in FIG. 2, the unmanned vehicle 22 is provided to travel along at least a portion of a length L of the conveyor 10 to inspect the belt 16 and rollers 12, 12' of the plurality of roller sets 24 while the conveyor 10 is operating.

Figure 3:
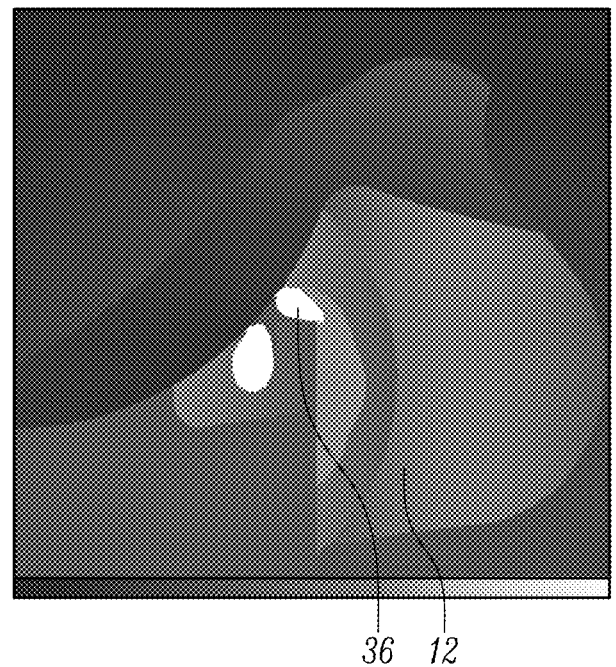
FIG. 3 is a thermal scan of a roller of the conveyor of FIG. 2 using the sensor structure.

The unmanned vehicle 22 may be conventional, such as of the type disclosed in U.S. Pat. No. 7,784,570 B2, having a platform 26 carrying sensor structure, generally indicated at 28. In the embodiment of FIG. 2, the sensor structure 28 includes an imaging sensor 30 disposed on mounting structure 29. In the embodiment of FIG. 2, the mounting structure 29 is a conventional pan and tilt mechanism 32 so as to be capable of motion in two degrees of freedom: rotation in a horizontal plane and in a vertical plane. The imaging sensor 30 is preferably a thermal imaging camera aimed at the roller structure 24 to capture visual and thermal images of the rollers 12, 12' of each roller structure 24 as the vehicle 22 travels along a side 34 of the operating conveyor 10. FIG. 3 is a thermal image captured by the imaging sensor 30 of FIG. 2, showing a hot spot 36 of a roller 12. The hot spot 36 indicates heat generated by friction which may indicated that the bearing of the roller 12 is damaged. A viewing angle of the imaging sensor 30 can be such that at least a portion of the underside of the belt 16 can be monitored to determine if there are defects in this belt portion.

In addition, the sensor structure 28 may include an acoustic sensor 37 to obtain acoustic signals along the length of the belt 16 as the vehicle 22 moves along the side 34 or 35 of the conveyor 10. Conventional frequency spectrum analysis of the acoustic data can be used to determine an abnormal pattern, for example, caused by jammed rollers 12, 12', or screeching of the belt 16. The sensor structure 28 may contain structure for obtaining thermal imaging data, infrared imaging data, visual imaging data, acoustic data or any combination of this data. If the data is thermal, infrared or visual, the sensor structure 28 may have zoom capabilities and can have an automatic or remote controllable focus.

Preferably, a wireless transceiver 35 on the sensor structure 28 or vehicle can communicate with a wireless receiver 38 that is provided on or near the conveyor 10. The receiver 38 receives signals 40 to thereby associate data that is captured by the imaging sensor 30 or the acoustic sensor 37 with position, so as to determine what part of the belt 16 or which roller 12, 12', of a set 24 is damaged or not functioning properly. Instead of transmitting the images or data, they can be stored in memory 42 that is provided on the vehicle 22 or that is part of the sensor structure 28, for later downloading.

The vehicle 22 can be controlled autonomously by an onboard control system 43 such as, for example, as disclosed in U.S. Pat. No. 7,499,776 B2. Alternatively, the vehicle can be controlled remotely by an operator using a remote control unit 44 such as, for example, as disclosed in U.S. Pat. No. 7,926,598 B2 or by GPS navigation. Manual and semi-autonomous control of the vehicle 22 is also contemplated. The content of each of U.S. Pat. No. 7,784,570 B2, U.S. Pat. No. 7,499,776 B2 and U.S. Pat. No. 7,926,598 B2 is hereby incorporated by reference into this specification. In another embodiment, a remote operator can take control of the system at any time during an autonomous inspection, such as when the system detects a problem. This would allow the remote operator to do a more thorough manual inspection of the equipment of interest.

Figure 4:
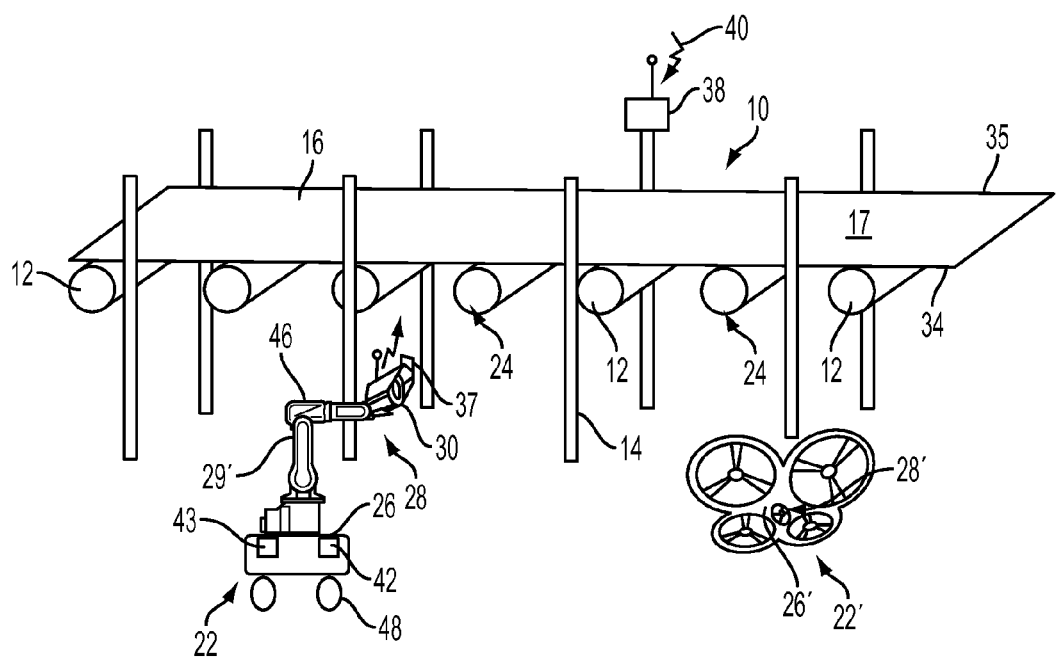
FIG. 4 is a schematic view of a portion of a forward flight of a conveyor with an unmanned vehicle having a robotic arm carrying sensor structure to inspect rollers at a side of the conveyor in accordance with another embodiment.

With reference to FIG. 4, instead of mounting the imaging sensor 30 and the acoustic sensor 37 on the two degree of freedom pan and tilt mechanism 32, the mounting structure 29' comprises a robot 46 that carries the sensors 30 and 37 for movement in more than two degrees of freedom. In the embodiment, the robot 46 has six degrees of freedom. This provides more mobility so as to move the sensors 30, 37 to ensure they are adjacent to the roller sets 24 as the vehicle 22 traverses changing terrain. Instead of providing the robot, the sensors 30 and 37 can be mounted on an extendable arm such as the Packbot® from iRobot Corp®. Preferably, the arm can be extended only when the vehicle 22 is stopped to closely monitor a point of interest on the conveyor 10. If desired, the arm can be extended to reach under the belt.

Since there are many portions of the frame 14 along the length of the conveyor 10 making it difficult to move the sensor structure 28' under the top flight 17 of the belt 16, the sensor structures 28 or 28' inspect only while being adjacent to a side 34 or 35 of the conveyer 10, without the need to move under the top flight of the belt 16. Once the vehicle 22 obtains data from one side 34 of the conveyor 10, the vehicle can move to the other side 35 and obtain data from that side while the conveyor 10 is in operation. As a result, more accurate data collection can be obtained from each of the outer rollers 12. It is noted that sensing of a roller 12, 12' of any set 24 may not occur due to accidentally being missed or because of the viewing angle, is not accessible, etc. In such cases, later attempts can be made to sense these missed rollers.

Any other unmanned vehicle capable of moving along rough terrain can be used to carry the sensor structures 28 or 28'. Alternatively, with reference to FIG. 4, a remote controlled flying vehicle such as a miniature helicopter or drone, generally indicated at 22', including the sensor structure 28 on platform 26', can be used instead of the vehicle 22 that has ground-engaging structure such as tracks or wheels 48. The vehicle 22' can be controlled to fly adjacent to the conveyor 10 near the outer rollers 12. The sensor structure 28' can be mounted on the platform 26' in the manner discussed above using regard to mounting structure 29 or 29. Furthermore, if the vehicle 22 is controlled by the remote control unit 44, the unit 44 can also control movement of the pan and tilt mechanism 32 or the robot 46.

Instead of fixing the acoustic sensor 37 to the sensor structure 28, the sensor 37 can be thrown, ejected or shot from the vehicle 22 onto a portion of the conveyor 10. Data from the sensor 37 can be transmitted through a connected wire and after the data reading, the sensor 37 can be recovered by coiling up the wire. Although a large mining conveyor 10 is disclosed as being inspected by the vehicle 22, the vehicle can inspect any type of conveyor.

The vehicle 22 with sensor structure 28 allows automatic and cost efficient inspection of the rollers and the belt of a conveyor to detect problems before belt failure and larger damages occur. Advantageously, inspections can be performed automatically and accurately with reduced or no manual intervention. Also, when anomalies are detected during the inspection, the sensor structure 28 can automatically perform additional measurements by viewing the problem area from additional angles and/or using additional sensors such as the acoustic sensor 37, or other sensors. Also, while moving alongside the conveyor, the sensor structure 28 can also be used to detect any other unusual sound or image not originating from the rollers but from other parts of the installation.

The vehicle 22 with sensor structure 28 thereon is also advantageous over conventional maintenance trolley systems in that the unmanned vehicle 22 with sensor structure 28 is not coupled to the conveyor 10. Therefore, the same inspection system can be used for a wider variety of conveyors. The vehicle is also more flexible in that the positions and angles of the inspection are not limited by the trolley configuration since the vehicle and movable mounting structure that carries the sensor structure 28 has more freedom of movement.

Figure 5:
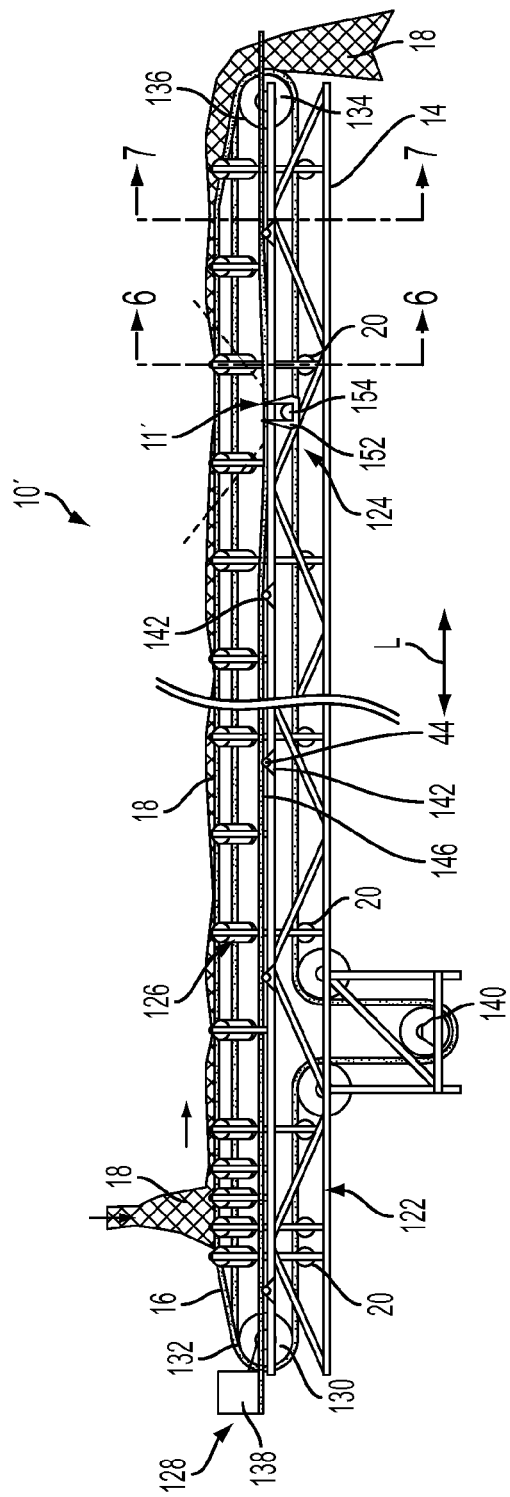
FIG. 5 is side schematic view of a conveyor with guide structure, in the form of a cable carrying sensor structure, at a side of the conveyor to inspect rollers and an underside of the conveyor belt, in accordance with another embodiment.
Figure 6:
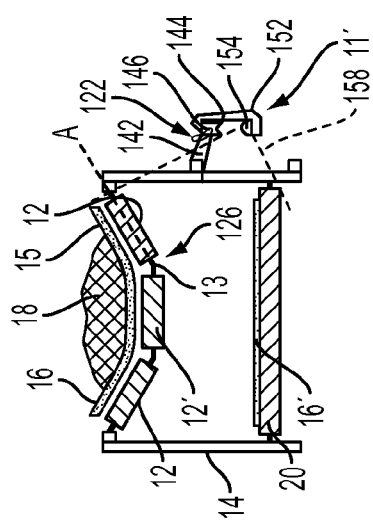
FIG. 6 is a sectional view taken along the line 6-6 in FIG. 5.

With reference to FIG. 5, a schematic view of a conveyor, generally indicated at 10, is shown with an associated inspection system, generally indicated at 11', to inspect rollers and an underside of the conveyor belt, in accordance with an embodiment. The inspection system 11' comprises guide structure 122, carrying sensor structure generally indicated at 124, disposed adjacent to at least one side of the conveyor 10'. The conveyor 10' is conventional and is preferably of the type shown in FIG. 1, having a plurality of roller sets or roller structures 126 carried by the frame 14 under a top flight 15 of the endless belt 16. Each roller structure 126 preferably includes the two outer rollers 12 and the central roller 12' as shown in FIG. 6. Each roller 12, 12' rotates about an axis A via bearings 13 as the endless belt 16 is conveyed along with material 18. The return flight of the belt 16' is supported by the lower rollers 20 (FIG. 4). Alternatively, the roller structure 126 can comprise two or more rollers.

Drive structure, generally indicated at 128, is provided for moving the belt 16. In the embodiment, the drive structure includes a first pulley 130 at a first end 132 and a second pulley 134 at the second end 136 of the conveyor 10'. At least one of the pulleys is powered. In the embodiment, a motor 138 drives the first pulley 130. A conventional belt tensioning roller 140 engages the return flight of the belt 16'. The roller 140 is adjustable to adjust the tension in the belt 16'.

As noted above, wear and abrasion of the belt 16 is caused by slip, friction, material movement, belt deformation, static and dynamic stretching forces, and environmental conditions. Additionally, the belt 16 may be damaged by misalignment and foreign material. Furthermore, failure of the idlers or rollers 12, 12' and roller bearings causes friction and abrasion. The bearings fail with increasing temperature. Therefore, a conveyor 10' is inspected regularly to detect problems before they result in downtime and larger damage. In accordance with an embodiment and as shown in FIG. 5, the guide structure, generally indicated at 122, carries the sensor structure 124 in a guided manner along the length L of the conveyor 10' to inspect the belt 16 and rollers 12, 12' of the plurality of roller sets 126 while the conveyor 10' is operating.

Figure 7:
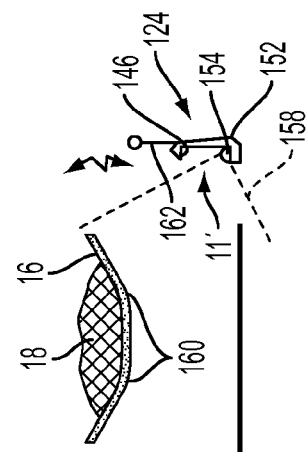
FIG. 7 is a sectional view taken along the line 7-7 in FIG. 5.
Figure 8:
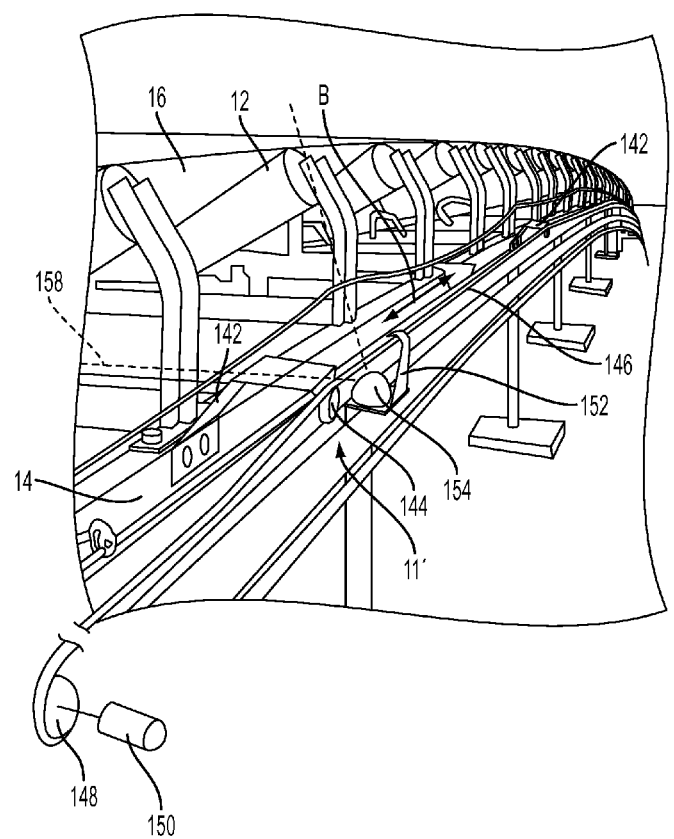
FIG. 8 is a view of a portion of the guide structure, in the form of a cable, which carries the sensor structure in accordance with an embodiment.

The guide structure 122 includes a plurality of supports 142 that are fixed to at least one side of the frame 14 of the conveyor 10' and spaced along a length of the frame 14. In the embodiment of FIGS. 6-8, each support 142 includes a roller 144 for supporting a cable 146 that extends along the length L of the conveyor 10'. The cable 146 is moved by a pulley 148 driven by a motor 150 or by other systems for moving a cable.

The sensor structure 124 includes a vehicle or carrier 152 that moves together with the cable 146 in a guided manner in the directions B of FIG. 8. The sensor structure 124 also includes an imaging sensor 154 disposed on the carrier 152 for movement therewith. The imaging sensor can be mounted to the carrier 152 using a conventional pan and tilt mechanism so as to be capable of motion in two degrees of freedom: rotation in a horizontal plane and in a vertical plane. The imaging sensor 154 is preferably a thermal imaging camera (capable of zooming) aimed at the roller structure 126 to capture visual and thermal images of the rollers 12, 12' of each roller structure 126 and underside of the belt 16 as the carrier, with sensor 154, travels along a side of the operating conveyor 10'. The imaging sensor 154 of FIG. 5 can be used to capture a thermal image (such as shown in FIG. 3) that indicates a hot spot 36 of a roller 12. The hot spot 36 indicates heat generated by friction which may indicated that the bearing of the roller 12 is damaged. The field of view 158 of the sensor 154 is such that the roller structures 126 and at least a portion of the underside of the belt 16 (see FIG. 7) can be monitored to determine if there are defects in the monitored belt portion, particularly at the bent areas 160 of the belt 16. Instead of or in addition to a thermal image camera, the imaging sensor 154 can be a visual image camera or a camera with sensitivity in the near infrared. In addition, or in the alternative, the sensor structure 124 can include a microphone such a directional microphone for obtaining acoustic signals from the conveyor 10'. More than one sensor structure 124 can be provided on the cable 146. Also, it can be appreciated that a guide structure 122 and associated sensor structure(s) 124 can be provided on each side of the conveyor. Furthermore, instead of moving the cable 146, the cable can be static and the carrier 152 can be self-propelled.

Preferably, a wireless transceiver 162 (FIG. 7) on the sensor structure 124 permits the transfer of data to and from the sensor structure 124. The transceiver 162 receives signals to thereby associate data that is captured by the imaging sensor 154 with position, so as to determine what part of the belt 16 or which roller 12, 12, of a set 126 is damaged or not functioning properly. Instead of transmitting the images or data, they can be stored in memory that is provided on the sensor structure 124 for later downloading.

Figure 9:
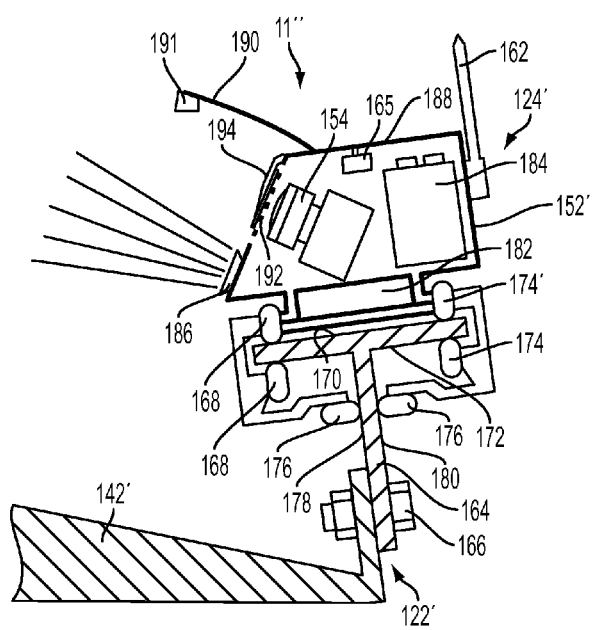
FIG. 9 is a schematic sectional view of a portion of the guide structure, in the form of a track, which carries the sensor structure in accordance with another embodiment.

With reference to FIG. 9, another embodiment of an inspection system is shown generally indicated at 11". The system 11" comprises guide structure 122' and sensor structure 124'. The guide structure 122' includes a plurality of supports 142' that are fixed to at least one side of the frame 14 of the conveyor 10' and spaced along a length of the frame 14 (similar to supports 142 in FIG. 5). A guide rail 164 is fixed by bolts 166 or the like to the supports 142' and extends along at least one side of the conveyor 10'. The guide rail 164 is a rigid track, preferably of T-shape. The sensor structure 124' includes a carrier 152' that moves along the guide rail 164 in a guided manner. In particular, the carrier 152' includes a first set of rollers 168 engaged with opposing surfaces 170, 172 at one end of the horizontal leg of the T-shaped rail 164, a second set of rollers 174 engaged with the opposing surfaces 170, 172 at the other end of the horizontal leg of the T-shaped rail 164, a third set of rollers 176 engaged with opposing surfaces 178, 180 of the vertical leg of the T-shaped rail 164. The sets of carrier rollers 168, 174, 176 permit guided movement of the carrier 152' along the guide rail 164. At least one of the rollers, e.g., roller 174' is driven by an electric motor 182 to propel the carrier 152' along the rail 164. A battery 184 powers the motor 182. Alternatively, a solar panel can provide power to the motor 182, or an electrical connector can be provided to connect the motor 182 to an external power supply. Other ways to move the carrier 152' along the rail 164 are possible, such as air propulsion, or a motor driven pulley system.

The imaging sensor 154 is mounted on the carrier 152'. A battery-powered light source 186 can be provided on the carrier 152' to create defined lighting conditions at the underside of the belt 116. A pan and tilt unit can be provided for the imaging sensor 154 and/or the light source 186. The wireless transceiver 162 on the sensor structure 124' permits the transfer of data to and from the sensor structure 124' and can control the motor 182 remotely for moving the carrier 152'. A housing 188 of the carrier 152' provides an enclosure for the imaging sensor 154 so as to protect the imaging sensor 154 from harsh outdoor conditions. Heating or cooling systems can be provided in the housing 188. A sunshield 190 can be provided to ensure that the imaging sensor 154 operates under the most optimum lighting conditions. An acoustic sensor or microphone 191 can be mounted on the sunshield 191 or other part of the sensor structure 124'. A viewing window 192 is provided in the housing 188, through which the imaging camera obtains images. A wiper 194 with a spray cleaner can be provided to clean the window 192. Also, while moving alongside the conveyor, the acoustic sensor 191 can also be used to detect any other unusual sound or image not originating from the rollers but from other parts of the installation.

The sensor structure 124, 124' movable on the guide structure 122, 122' allows inspection of all load carrying rollers 12, 12' and may also allow inspection of the lower support rollers 20. The imaging sensor 154 can take either videos or snapshot photos. This data is either recorded for later evaluation or transmitted to an inspection terminal and observed or recorded there. The microphone 191 takes audio readings of the turning rollers and the audio signal is recorded for later evaluation or transmitted to an inspection terminal and observed or recorded there. Optionally there is automatic data processing (e.g., spectrum analysis of audio data) that flags irregularities that may indicate a damaged roller or belt rips that need to be looked at by an operator. It is noted that sensing of a roller 12, 12' or 20 may not occur due to accidentally being missed or because of the viewing angle, is not accessible, etc. In such cases, later attempts can be made to sense these missed rollers.

There are various ways to correlate the recorded data with the location at the conveyor 10' where they were taken. For example, visual markers can be provided at the conveyor 10', such as numbers painted on the structure. If the cable 146 is pulled forward or backward, position encoders can be provided at the driving pulley 148 that coils up the cable. If initial position and travelling speed is known, a timestamp on the recorded data can be correlated to the location. If a GPS receiver 165 (FIG. 9) is available in the carrier 152', a timestamp on the recorded data can be correlated to the location. If initial position is known, the rollers can be counted as they pass through the field of view of the imaging sensor 154. This can either be done with simple image processing during recording or during later evaluation. The data recording can be automatic stopped when the sensor structure 124' reaches the end of the conveyor 10'.

The guide structure 122 and associated sensor structure 124 allows automatic and cost efficient inspection of the rollers and the belt of a conveyor to detect problems before belt failure and larger damages occur. Advantageously, inspections can be performed automatically and accurately with reduced manual intervention. Manual work is only required for placing and collecting the sensor structure 124. The quality of inspection is improved since the rollers and the belt are not only inspected from the side view, but all from a bottom view. Furthermore, when anomalies are detected during the inspection, the sensor structure 124 can automatically perform additional measurements by viewing the problem area from additional angles and/or using additional sensors such as the acoustic sensor, or other sensors.

Other features of the embodiments can include:
recording of the sensor data for later evaluation, visual and near infrared videos may be used for inspection of the belt while thermal videos may be used to detect failing roller bearings,
using the signal strength information from the wireless receivers placed along the conveyor to identify the position of the sensors
correlating the recording time with the position of roller set 24 that the vehicle has passed,
evaluating of recorded data and automatically create a report, with the report indicating those roller 12, 12' that have abnormally high temperature,
the report shows which rollers 1) have to be observed, 2) have to be replaced in near future, 3) have to be replaced immediately,
the report or evaluation anticipates which roller is likely to fail within a certain period of time, and
creating of history data about each roller from subsequent inspection tours.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of inspecting a conveyor having opposing sides and a length, the conveyor including an endless belt and a plurality of roller structures disposed in spaced relation along at least a portion of the length of the conveyor and under a top flight of the belt for supporting the belt while material is being conveyed on the belt, each roller structure including at least one exposed roller constructed and arranged to rotate about an axis as the belt is conveyed with the material, the method comprising the steps of:

(a) orienting an unmanned vehicle at one side of the conveyor, the unmanned vehicle being entirely separated from the conveyor and having sensor structure thereon, and (b) causing the vehicle to travel, independently of conveyance of the belt, with respect to the portion of the length of the conveyor while the sensor structure obtains data regarding a state of at least a portion of the belt and rollers of the plurality of roller structures while the conveyor is operating, wherein, while the vehicle is traveling, the sensor structure obtains the data only while being adjacent to the one side of the conveyer, without moving under the top flight of the belt.

2. The method of claim 1, further comprising the steps of:
orienting the unmanned vehicle, having sensor structure thereon, at the other side of the conveyor, and
performing step (b).

3. The method of claim 1, wherein each roller structure includes at least one central roller and outer rollers so that the belt forms a trough shape when the material is being conveyed thereon, and wherein the step of obtaining data includes obtaining data from each of the outer and central rollers.

4. The method of claim 3, wherein the step of obtaining data includes obtaining data the form of visual images or thermal images or acoustic data.

5. The method of claim 1, further comprising the step of associating the data with a position on the conveyor.

6. The method of claim 1, wherein the sensor structure includes an imaging sensor and an acoustic sensor and the method further comprises permitting all of the sensors to move about a horizontal plane and a vertical plane.

7. The method of claim 1, wherein the sensor structure includes an imaging sensor and an acoustic sensor and the method further comprises permitting all of the sensors to move in at least three degrees of freedom.

8. The method of claim 1, further comprising the steps of:
storing the data, and
analyzing the data to determining if the belt or certain of the rollers are damaged.

9. The method of claim 1, wherein the step of causing the vehicle to travel includes using autonomous vehicle control or remote control.

10. The method of claim 1, wherein the vehicle is a ground-engaging vehicle and the step of causing the vehicle to travel includes causing the vehicle to travel over the ground.

11. The method of claim 1, wherein the vehicle is capable of flight and the step of causing the vehicle to travel includes causing the vehicle to travel in the air adjacent to the conveyor.

12. A method of inspecting a conveyor having opposing sides and a length, the conveyor including an endless belt and a plurality of roller structures disposed in spaced relation along at least a portion of the length of the conveyor and under a top flight of the belt for supporting the belt while material is being conveyed on the belt, each roller structure including at least one exposed roller constructed and arranged to rotate about an axis as the belt is conveyed with the material, the method comprising the steps of:

(a) orienting an unmanned vehicle at one side of the conveyor, and (b) causing the vehicle to travel with respect to the portion of the length of the conveyor while the sensor structure obtains data regarding a state of at least a portion of the belt and rollers of the plurality of roller structures while the conveyor is operating; wherein:

while the vehicle is traveling, the sensor structure obtains the data only while being adjacent to the one side of the conveyer, without moving under the top flight of the belt, the vehicle is capable of flight and the step of causing the vehicle to travel includes causing the vehicle to travel adjacent to, but independent of, the conveyor, and the step of obtaining data includes obtaining data in a form of thermal images.

* * * * *